May 31, 1938.  M. A. DEFIBAUGH  2,119,423
WINDSHIELD
Filed Dec. 18, 1935
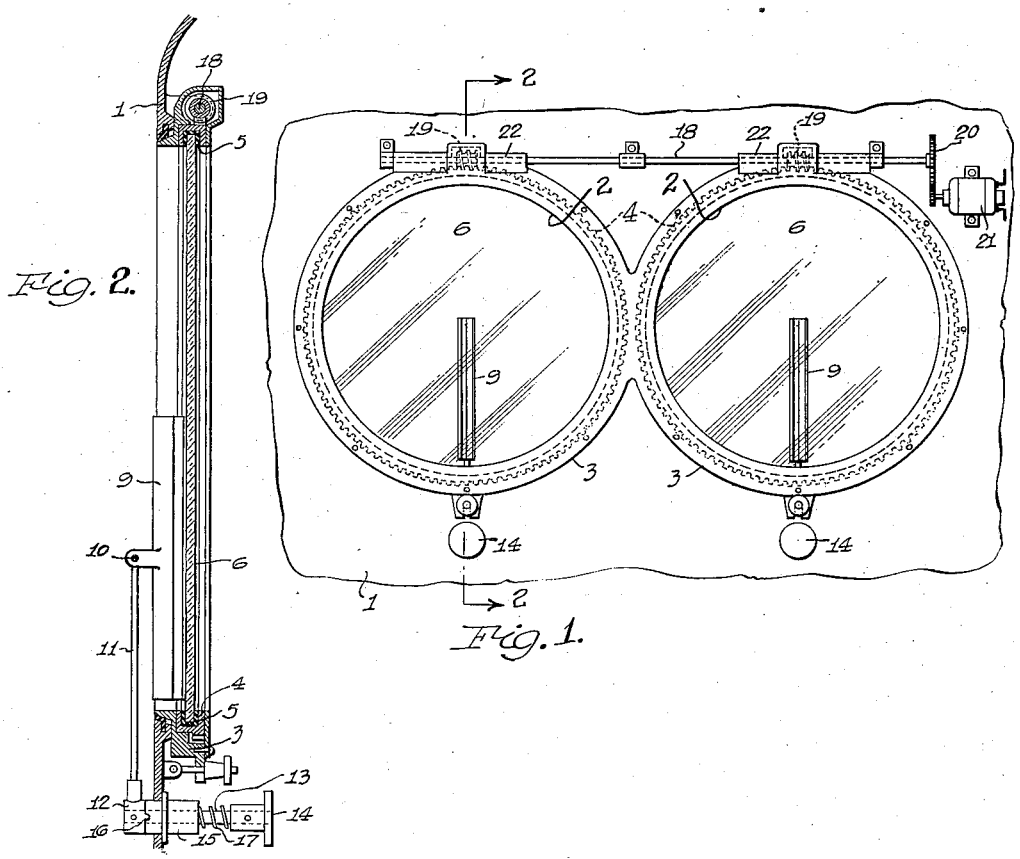
INVENTOR
Mark A. Defibaugh,
BY
ATTORNEYS Patented May 31, 1938

2,119,423

UNITED STATES PATENT OFFICE 2,119,423

WINDSHIELD

Mark A. Defibaugh, Lake Orion, Mich.

Application December 18, 1935, Serial No. 54,968

3 Claims. (Cl. 15—250)

This invention relates to mechanism for removing rain, sleet or other extraneous matter from the surface of glass or other transparencies, and more particularly to a windshield for motor cars arranged to effect such removal therefrom of such matter. An object of the present invention is to provide a construction in which the glass is movable and the wiper is stationary, thus obviating the necessity for a reciprocable or other movable member to sweep across the surface of the glass, which member, especially in connection with a windshield, tends to confuse the driver and obstructs his vision.

It is also an object to secure a better and more positive cleaning action over a more extended area and to provide an arrangement whereby substantially the entire area of the windshield glass may be wiped clean and maintained in that condition.

A further object is to provide power means for reciprocating or rotating the glass to be cleaned, and to provide a stationary cleaning member to sweep the entire surface of the movable glass, said member being mounted for hand manipulation where the glass is rotated, so that said member may be shifted out of contact therewith when rotation is discontinued, or may be manipulated to sweep across the glass when the glass is held stationary; and also to provide an arrangement of drive for the glass whereby the glass framing may be pivotally mounted to swing to open position for the purpose of ventilation.

It is also an object to provide certain other new and useful features in the construction, arrangement and combination of parts, all as hereinafter more fully described and shown in the accompanying drawing wherein, Fig. 1 is a rear elevation of a windshield showing the construction thereof and illustrating a form of power drive therefor, and Fig. 2 is an enlarged vertical section substantially upon the line 2—2 of Figure 1.

As ordinarily constructed, the body of a motor car is usually closed at its forward end above the cowl, by means of a windshield comprising a pivoted or otherwise mounted frame of substantially rectangular form for holding the glass, this frame having little effect in tying together the sides of the body at its forward end.

In the present construction as shown in Figure 1 the forward end of the body is closed by a plate forming a wall 1, which plate is rigidly secured at its ends to the side portions of the body and at its top and bottom sides to the roof and cowl portions respectively of the body. This plate or wall, therefore, forms a rigid connection between the sides of the body to prevent weaving or twisting movements of the body, and this wall 1 is formed with one or more circular openings 2 which are of a diameter as large as is permissible within the vertical width of the wall 1, and secured to the rear face of this wall is a double ring channel member 3 with the channel of one ring opening into the channel of the other ring at their adjacent sides. Within these channels are mounted two annular ring gears 4 having peripheral teeth, with the teeth of one ring out of mesh with the teeth of the other ring. Each ring gear is also formed with an inner channel to receive a packing 5 mounted upon the peripheral edge of the glass disk 6 which closes each of the openings 2 and is adapted to rotate with the ring gears, said annular gears each forming a frame for each disk.

To remove rain, sleet or snow or other matter from the outside face of each glass disk 6, a wiper 9 is provided for each of these glass disks, the wiper being preferably mounted at the lower side of each disk and held in a fixed position against the surface of the disk. Each of these wipers 9 is pivotally attached at 10 to the upper end of a rod 11 which is secured at its lower end by a head 12 to the forward end of a shaft 13 extending through an opening in the wall 1 below each of the openings 2 which are closed by the disks 6 and on the inner end of this shaft 13 is a handle 14 by means of which the shaft may be turned to swing the wiper about the axis of said shaft and move it from engagement with the glass and out of the range of vision of the driver.

This shaft 13 is mounted within a bearing 15 on the wall 1 and this bearing is provided with transverse grooves or notches in its outer end to be engaged by a rib 16 upon the head 12, and to hold the shaft 13 moved endwise inwardly and thus normally hold the rib 16 in engagement with one of the notches in the bearing, a spring 17 is sleeved upon the shaft between said bearing and handle 14. Therefore, the operator by pressing forwardly upon the handle 14, may disengage the head 12 from engagement with the bearing and swing the rod 11 and wiper 9 to the desired position either in contact with the glass or out of contact therewith, and when so moved it will be held in that position by the re-engagement of the rib 16 with the notches in the end of the bearing 15. The wiper when in contact with the glass is therefore held in a fixed position with the wiper extending upwardly toward the axis of rotation of the glass to wipe the surface thereof as the glass is rotated and remove any accumulation of foreign matter therefrom.

As shown in Figure 1 the two ring gears 4 may be simultaneously rotated by providing a shaft 18 mounted in bearings and extending across the peripheries of the two ring gears, said shaft being provided with worms 19 to engage the peripheral teeth of the gears 4 and simultaneously rotate these gears in the same direction, power being applied to the shaft 18 through gearing 20 from an electric motor 21 which may be mounted in any convenient position, this form of drive providing for a simultaneous rotation of the glass disks in the same direction and also providing for the pivotal mounting of the double ring channel 3, said channel with its ring gears and glass disks mounted therein, being pivotally attached to the shaft 18 by means of ears 22 on the double channel, each forming a housing for each worm 19 and being adapted to swing the double channel about the axis of these worms, the double channels being supported by said ears to turn independently of the worm 1 with said ring gear in contact with said worms. Therefore, the double channel member which carries the ring gears 4 and the glass disks 6 mounted therein, may be swung away from the openings 2 in said wall and provide for the opening of the windshield for the purpose of ventilation.

It is obvious that the glass disks shown in Figures 1 and 2 may be power driven as shown or may be rotated by means of hand power if so desired, and it is obvious that one or more of these transparent disks may be employed.

Having thus fully described my invention, what I claim is:—

1. A closure device for the front end of a motor vehicle body, formed with a circular opening said device including a frame having a channel extending along the periphery of said opening, said frame being pivotally supported at one side of said openings to swing toward and from the same, a glass disk to close said opening, an annular member engaging the peripheral edge of said disk and rotatively mounted in said channel, a shaft forming the pivotal support for said frame, means on said shaft for rotating said annular member, and a wiper for said disk.

2. A device for the purpose described including a body member having a circular opening, a frame, a ring gear mounted on said frame for rotation about said opening, a glass disk mounted in said ring gear to close said opening, a driving gear mounted in bearings at one side of said opening and in mesh with said ring gear, and means on said frame for pivotally supporting said frame to swing toward and from said opening with said driving gear maintained in mesh with said ring gear.

3. A device for the purpose described including a body member formed with circular openings arranged side by side, a frame provided with channels extending along the peripheries of said openings, a ring gear in each channel, a glass disk within each ring gear adapted to close said openings, a shaft mounted in bearings upon said body member and extending adjacent the peripheries of said ring gears, driving gears upon said shaft in mesh with said ring gears, ears projecting laterally from said frame through which said shaft extends for pivotally supporting said frame to swing toward and from said openings, said ears being each formed with a chamber to receive one of said driving gears and to turn about said gears upon the longitudinal axis of said shaft, whereby said driving gears are maintained in mesh with said ring gears and said frame is pivotally supported to swing about the axis of said driving gears toward and from said openings.

MARK A. DEFIBAUGH.